US009680331B2

(12) United States Patent
Keeling et al.

(10) Patent No.: US 9,680,331 B2
(45) Date of Patent: Jun. 13, 2017

(54) SYSTEM AND METHOD FOR FREQUENCY PROTECTION IN WIRELESS CHARGING

(71) Applicant: QUALCOMM Incorporated, San Diego, CA (US)

(72) Inventors: Nicholas Athol Keeling, Auckland (NZ); Jonathan Beaver, Auckland (NZ); Michael Le Gallais Kissin, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 14/555,380

(22) Filed: Nov. 26, 2014

(65) Prior Publication Data

US 2015/0270739 A1    Sep. 24, 2015

Related U.S. Application Data

(60) Provisional application No. 61/968,255, filed on Mar. 20, 2014.

(51) Int. Cl.
| | |
|---|---|
| *H02J 7/00* | (2006.01) |
| *H02J 7/02* | (2016.01) |
| *B60L 11/18* | (2006.01) |
| *H02J 5/00* | (2016.01) |
| *H02J 17/00* | (2006.01) |
| *B60L 3/00* | (2006.01) |
| *B60L 3/04* | (2006.01) |

(52) U.S. Cl.
CPC ............ *H02J 7/025* (2013.01); *B60L 3/003* (2013.01); *B60L 3/04* (2013.01); *B60L 11/182* (2013.01); *B60L 11/1824* (2013.01); *B60L 11/1846* (2013.01); *H02J 5/005* (2013.01); *H02J 7/007* (2013.01); *H02J 7/0029* (2013.01); *H02J 17/00* (2013.01); *B60L 2210/30* (2013.01); *B60L 2210/40* (2013.01); *B60L 2270/147* (2013.01); *Y02T 10/7005* (2013.01); *Y02T 10/7072* (2013.01); *Y02T 10/7241* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC .................................. H02J 5/005; H02J 7/025
USPC ........................................................ 320/108
See application file for complete search history.

(56) References Cited

U.S. PATENT DOCUMENTS

| | | | | |
|---|---|---|---|---|
| 2008/0079392 | A1* | 4/2008 | Baarman | H02J 7/0072 320/108 |
| 2011/0109263 | A1* | 5/2011 | Sakoda | B60L 11/182 320/108 |
| 2012/0169132 | A1 | 7/2012 | Choudhary et al. | |
| 2013/0082653 | A1 | 4/2013 | Lee et al. | |
| 2014/0015328 | A1 | 1/2014 | Beaver et al. | |
| 2014/0125287 | A1 | 5/2014 | Nakano et al. | |
| 2014/0159502 | A1* | 6/2014 | Shimokawa | H02J 17/00 307/104 |
| 2014/0176054 | A1* | 6/2014 | Porat | H02J 7/025 320/108 |
| 2014/0300317 | A1* | 10/2014 | Kim | H02J 7/04 320/108 |
| 2015/0251545 | A1* | 9/2015 | Matsukura | H02J 5/005 320/108 |

FOREIGN PATENT DOCUMENTS

| | | |
|---|---|---|
| EP | 2793354 A1 | 10/2014 |
| WO | WO-2013088488 A1 | 6/2013 |
| WO | WO-2014006627 A1 | 1/2014 |
| WO | WO-2014057343 A1 | 4/2014 |

OTHER PUBLICATIONS

International Search Report—PCT/US2015/020760—ISA/EPO—Jun. 22, 2015.

* cited by examiner

*Primary Examiner* — Arun Williams
(74) *Attorney, Agent, or Firm* — Knobbe, Martens, Olson & Bear, LLP

(57) ABSTRACT

This disclosure provides systems, methods, and apparatuses for controlling wireless charging between a first entity and a second entity. For example, the apparatus may include a receiver communication circuit of the first entity configured to receive a current from a second entity via electromagnetic induction during the charging or alignment with the second entity. The apparatus may include a frequency measurement circuit configured to determine an operating frequency of the received current or a voltage induced by the electromagnetic induction. The apparatus may include a controller configured to compare the operating frequency to a threshold and adjust an operation of the charging or the alignment based on the comparison.

27 Claims, 9 Drawing Sheets

SYSTEM AND METHOD FOR FREQUENCY PROTECTION IN WIRELESS CHARGING

CROSS-REFERENCE TO RELATED APPLICATION

This application claims priority under 35 U.S.C. §119(e) to U.S. Provisional Application No. 61/968,255, filed Mar. 20, 2014, which is hereby expressly incorporated by reference herein.

FIELD

The described technology generally relates to wireless power. More specifically, the disclosure is directed to devices, systems, and methods for assessing frequency interoperability between a transmitter and a receiver during wireless charging.

BACKGROUND

Remote systems, such as vehicles, have been introduced that include locomotion power derived from electricity received from an energy storage device, such as a battery. For example, hybrid electric vehicles include on-board chargers that use power from vehicle braking and traditional motors to charge the vehicles. Vehicles that are electric may receive the electricity for charging the batteries from other sources. Battery electric vehicles (electric vehicles) have been proposed to be charged via a wired alternating current (AC) source, such as household or commercial AC supply sources. Wired charging connections require cables or other similar connectors that are physically connected to a power supply. Wireless charging systems that are capable of transferring power in free space (e.g., via a wireless field) to be used to charge electric vehicles may overcome some of the deficiencies of wired charging solutions.

Wireless power transfer systems may differ in many aspects including circuit topologies, magnetics layout and power transmission capabilities or requirements. Further, the wireless power transfer systems may differ with respect to operating frequencies during inductive power transfer (IPT). In this context, there is a need to assess the frequency interoperability between the charging unit and the receiving unit.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a device/apparatus for frequency protection during wireless charging. For example, the device may include a receiver communication circuit of a first entity configured to receive a current wirelessly from a second entity via electromagnetic induction during the charging or alignment with the second entity. The device may further include a frequency measurement circuit configured to determine an operating frequency of the received current or a voltage induced by the electromagnetic induction. The device may include a controller configured to compare the operating frequency to a threshold and adjust an operation of the charging or the alignment based on the comparison, wherein the controller is configured to adjust the operation via continuing the charging or the alignment in response to a difference between the operating frequency and the threshold being less than or equal to a first tolerance level, and via stopping or refusing the charging or the alignment in response to the difference being greater than the first tolerance level.

In related aspects, the disclosure provides an apparatus for controlling wireless charging between a first entity and a second entity. For example, the apparatus may include means for receiving a current wirelessly from the second entity via electromagnetic induction during the charging or alignment with the second entity. The apparatus may also include means for determining an operating frequency of the received current or a voltage induced by the electromagnetic induction, and means for comparing the frequency to a threshold. The apparatus may further include means for adjusting an operation of the charging or the alignment based on the comparison, the means for adjusting comprising means for continuing the charging or the alignment in response to a difference between the operating frequency and the threshold being less than or equal to a first tolerance level, the means for adjusting further comprising means for stopping or refusing the charging or the alignment in response to the difference being greater than the first tolerance level.

Another aspect of the disclosure provides a method for controlling wireless charging. For example, the method may involve receiving a current wirelessly from a second entity via electromagnetic induction during the charging or alignment with the second entity. The method may involve determining an operating frequency of the received current or a voltage induced by the electromagnetic induction, and comparing the frequency to a threshold. The method may further involve adjusting an operation of the charging or the alignment based on the comparison via continuing the charging or the alignment in response to a difference between the operating frequency and the threshold being less than or equal to a first tolerance level, and via stopping or refusing the charging or the alignment in response to the difference being greater than the first tolerance level.

DETAILED DESCRIPTION

The detailed description set forth below in connection with the appended drawings is intended as a description of certain implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed implementations. In some instances, some devices are shown in block diagram form.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

Because different inductive power transfer (IPT) chargers run at different frequencies, it is desirable to assess interoperability between a base charging unit and a receiving unit (e.g., an electric vehicle). A fault in the base charging unit or the receiving unit can cause a change or drift in frequency, which can result in reduced efficiency or extra stress associated with the IPT. Provided herein is a technique for measuring the frequency of received currents/signals and making sure they are within a defined tolerance; otherwise, the IPT connections may be shutdown or refused.

Figure 1:
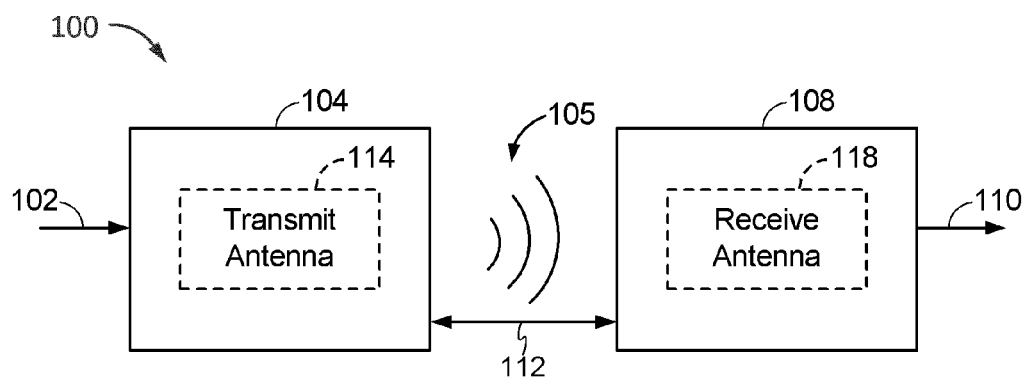
FIG. 1 is a functional block diagram of a wireless power transfer system, in accordance with one exemplary implementation.

FIG. 1 is a functional block diagram of a wireless power transfer system 100, in accordance with one exemplary implementation. An input power 102 may be provided to a transmitter 104 from a power source (not shown) to generate a wireless (e.g., magnetic or electromagnetic) field 105 for performing energy transfer. A receiver 108 may couple to the wireless field 105 and generate an output power 110 for storing or consumption by a device (not shown) coupled to the output power 110. Both the transmitter 104 and the receiver 108 are separated by a distance 112.

In one exemplary implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. As such, wireless power transfer may be provided over a larger distance in contrast to purely inductive solutions that may require large antenna coils which are very close (e.g., sometimes within millimeters). Resonant inductive coupling techniques may thus allow for improved efficiency and power transfer over various distances and with a variety of inductive coil configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. The transmitter 104 may include a transmit antenna or coil 114 for transmitting energy to the receiver 108. The receiver 108 may include a receive antenna or coil 118 for receiving or capturing energy transmitted from the transmitter 104. The near-field may correspond to a region in which there are strong reactive fields resulting from the currents and charges in the transmit coil 114 that minimally radiate power away from the transmit coil 114. The near-field may correspond to a region that is within about one wavelength (or a fraction thereof) of the transmit coil 114.

As described above, efficient energy transfer may occur by coupling a large portion of the energy in the wireless field 105 to the receive coil 118 rather than propagating most of the energy in an electromagnetic wave to the far field. When positioned within the wireless field 105, a "coupling mode" may be developed between the transmit coil 114 and the receive coil 118. The area around the transmit antenna 114 and the receive antenna 118 where this coupling may occur is referred to herein as a coupling-mode region.

Figure 2A:
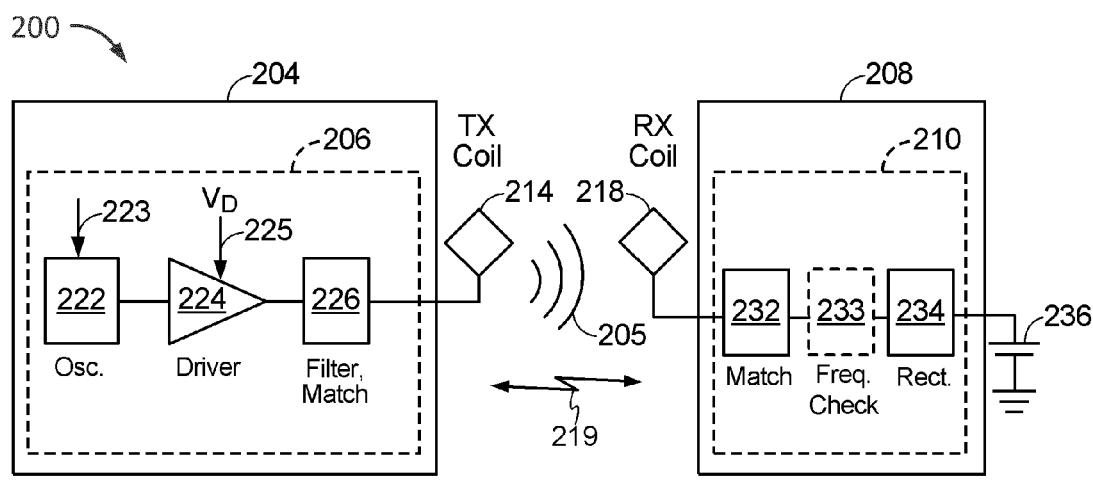
FIG. 2A is a functional block diagram of a wireless power transfer system, in accordance with another exemplary implementation.

FIG. 2A is a functional block diagram of a wireless power transfer system 200, in accordance with another exemplary implementation. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive a transmit antenna 214 at, for example, a resonant frequency of the transmit antenna 214 based on an input voltage signal ($V_D$) 225. The driver circuit 224 may be a switching amplifier configured to receive a square wave from the oscillator 222 and output a sine wave. For example, the driver circuit 224 may be a class E amplifier.

The filter and matching circuit 226 may filter out harmonics or other unwanted frequencies and match the impedance of the transmitter 204 to the transmit antenna 214. As a result of driving the transmit antenna 214, the transmit antenna 214 may generate a wireless field 205 to wirelessly output power at a level sufficient for charging a battery 236 of an electric vehicle, for example.

The receiver 208 may include a receive circuitry 210 that may include a matching circuit 232 and a rectifier circuit 234. The matching circuit 232 may match the impedance of the receive circuitry 210 to a receive antenna 218. The rectifier circuit 234 may generate a direct current (DC) power output from an alternate current (AC) power input to charge the battery 236, as shown in FIG. 2A. The receiver 208 and the transmitter 204 may additionally communicate on a separate communication channel 219 (e.g., Bluetooth, Zigbee, cellular, etc). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236.

In accordance with one or more aspects of the present disclosure, the receive circuitry 210 may include circuitry component(s) configured to measure a frequency of a received current/signal or induced voltage from the transmit circuitry 206 to make sure that the measured frequency is within a tolerance range or level, and, otherwise, shutdown or refuse the connection with the transmit circuitry 206 if the measured frequency is not within the tolerance range or level. It is noted that the induced voltage corresponds to a voltage induced by electromagnetic induction during wireless charging and is generally associated with or otherwise corresponds to the received current. In related aspects, the received current may be proportional to the induced voltage.

Similarly, in a scenario where the transmit circuitry 206 receives a current/signal via electromagnetic induction from the receive circuitry 210, such as, for example, in the context of two-way communication between the transmitter 204 and the receiver 208, the transmit circuitry 206 may include circuitry component(s) configured to measure a frequency of a received current/signal or an induced voltage from the receive circuitry 206 to make sure that the measured frequency is within a tolerance range or level, and, otherwise, shutdown or refuse the connection with the receive circuitry 210 if the measured frequency is not within the tolerance range or level.

In related aspects, the frequency of the received current or induced voltage may be measured/monitored by the receive circuitry 210 and/or the transmit circuitry 206 during the charging process, such as, for example, during a charging process involving wireless power transfer from the transmitter 204 to the receiver 208. In further related aspects, the frequency of the received current or induced voltage may be measured/monitored by the receive circuitry 210 and/or the transmit circuitry 206 during an alignment process (e.g., FIGS. 4A-E), such as, for example, when the receiver 208 comprises or is part of a vehicle (e.g., the electric vehicle 401 of FIG. 5) that is aligned with the transmitter 204 comprises or is part of a wireless power transfer system (e.g., the system 500 of FIG. 5) that charges the vehicle.

In one implementation, the matching circuit 232 of the receive circuitry 210 and/or the filter and matching circuit 226 of the transmit circuitry 206 may be configured to measure the frequency of a received current or induced voltage, compare the measured frequency to a nominal frequency, and/or determine whether the error/difference between the measured frequency and the nominal frequency is greater than a threshold value, such as, for example, an error of 3%, 5%, 7%, etc. The threshold value may depend on the particular application or the preferences of the user, system administrator, or the like.

In another implementation, an optional frequency checking component 233 may be configured to measure the frequency of the received current or induced voltage, compare the measured frequency to the nominal frequency, and/or determine whether the error/difference between the measured frequency and the nominal frequency is greater than a threshold value. The frequency checking component 233 may operate in conjunction with or in lieu of the matching circuit 232 to monitor the frequency of the received current or induced voltage. The frequency checking component 233 may be part of the receive circuitry 210 as shown; however, the transmit circuitry 206 may also include a frequency checking component or the like.

In related aspects, a controller/processor of the receive circuitry 210 may operate in conjunction with or in lieu of the matching circuit 232 and/or the frequency checking component 233 to monitor the frequency of the received current or induced voltage. In further related aspects, a controller/processor of the transmit circuitry 206 may operate in conjunction with or in lieu of the filter and matching circuit 226 and/or an optional frequency checking component to monitor the frequency of the received current or the induced voltage.

Figure 2B:
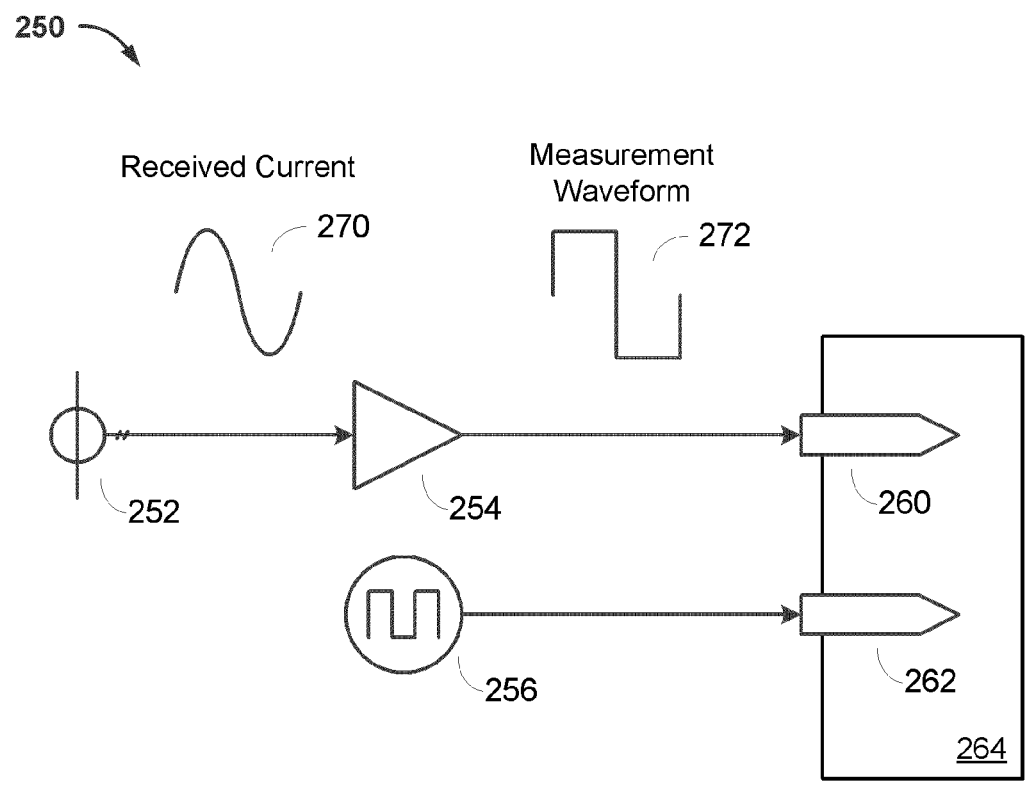
FIG. 2B illustrates an exemplary measurement circuitry that measures or monitors the frequency of a current received via electromagnetic induction in the wireless power transfer system of FIG. 2A.

FIG. 2B shows exemplary measurement circuitry 250 that may be implemented to measure or monitor the frequency of a current/signal received via IPT, such as, for example, in the system 200 in FIG. 2A. In related aspects, the circuitry 250, or component(s) thereof, may be included as part of the matching circuit 232, the frequency checking component 233, or the like on the receiver 208 side. The circuitry 250, or component(s) thereof, may be included as part of or separate from the receive circuitry 210 on the receiver 208 side. In further related aspects, the circuitry 250, or component(s) thereof, may be included as part of the filter and matching circuit 226 or the like on the transmitter 204 side. In further related aspects, the circuitry 250, or component(s) thereof, may be included as part of or separate from the receive circuitry 210 on the receiver 208 side. The circuitry 250, or component(s) thereof, may be included as part of or separate from the transmit circuitry 206 on the transmitter 204 side.

For example, the measurement circuitry 250 may include a current transformer 252 operatively coupled to an edge detector 254, which in turn may be operatively coupled to a microcontroller input 260 or the like. The circuitry 250 may further include a reference clock 256 operatively coupled to a microcontroller input 262 or the like. The microcontroller inputs 260 and 262 may be part of or operatively coupled to a microcontroller 264. The current transformer 252 may receive and/or measure the received current or induced voltage, may optionally produce a reduced current that is proportional to the received current or induced voltage. The current transformer 252 provides the received current or induced voltage 270 (reduced or otherwise) to the edge detector 254. The edge detector 254 may include an edge trigger or the like to produce a measurement waveform 272, which may be a pulse waveform that indicates that frequency of the received current or induced voltage 270. The measurement waveform 272 is provided to microcontroller input 260.

The reference clock 256 may provide a pulse waveform (not shown), which indicates the nominal or known/target frequency, to the microcontroller input 262. A microcontroller 264 may be configured to measure the system operation/operating frequency by comparing the frequency values provided via inputs 260 and 262. The microcontroller 264 may be configured to instruct the other component(s) of the receiver 208 or the transmitter 204 (depending on whether the circuitry 250 is on the receiver 208 side or the transmitter 204 side) to continue with a given process (e.g., charging process or alignment process) if the error/difference between the frequency values provided via inputs 260 and 262 is not greater than a tolerance/threshold level (e.g., 5%). The microcontroller 264 may be configured to instruct the other component(s) (of the receiver 208 or the transmitter 204) to stop the given process if the difference between the frequency values provided via inputs 260 and 262 exceeds the tolerance level.

In one implementation, the measurement circuitry 250 may be configured to measure an operating frequency of the received current or induced voltage, and to compare the operating frequency to a nominal frequency to determine a first error value between the operating and nominal frequencies. A component of the measurement circuitry 250 (e.g., the microcontroller 264) may be further configured to determine whether to continue the wireless charging or the alignment based at least in part on the first error value. For example, the measurement circuitry 250 may be configured to continue a wireless charging process or an alignment process in response to the first error value being less than or equal to a tolerance level for a difference between the operating frequency and the nominal frequency. The measurement circuitry 250 may be configured to stop or refuse the wireless charging process or the alignment process in response to the first error value being greater than the tolerance level (e.g., a 5% difference between the operating and nominal frequencies).

In another implementation, the measurement circuitry 250 may be configured to measure a first operating frequency of a first current received during a first process/phase (e.g., the wireless charging process). The first operating frequency may be stored in a memory unit, which may be part of or operatively coupled to the microcontroller 264. The measurement circuitry 250 may be further configured to measure a second operating frequency of a second current received during a second process/phase (e.g., the alignment process). The measurement circuitry 250 may be further configured to compare the first and second operating frequencies to determine a second error value between the first and second operating frequencies (corresponding to the first and second processes, respectively). A component of the measurement circuitry 250 (e.g., the microcontroller 264) may be further configured to determine whether to continue the second process based at least in part on the second error value. For example, the measurement circuitry 250 may continue the second process in response to the second error value being less than or equal to a tolerance level for a difference between the first and second operating frequencies. The measurement circuitry 250 may stop or refuse the second process in response to the second error value being greater than the tolerance level (e.g., a 5% difference between the first and second operating frequencies).

In related aspects, the measurement circuitry 250, the receive circuitry 210, and/or the transmit circuitry 206, or component(s) thereof, may be configured to monitor the IPT system operation/operating frequency according to the features described herein, including the features of the exemplary methodologies described with reference to FIGS. 6A-8.

Figure 3:
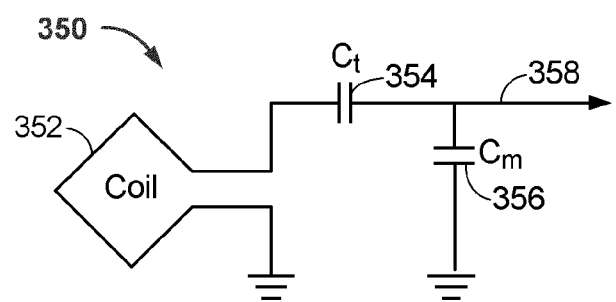
FIG. 3 is a schematic diagram of a portion of transmit circuitry or receive circuitry of FIG. 2A including a transmit or receive antenna, in accordance with exemplary implementations.

FIG. 3 is a schematic diagram of a portion of the transmit circuitry 206 or the receive circuitry 210 of FIG. 2A including a transmit or receive antenna, in accordance with exemplary implementations. As illustrated in FIG. 3, a transmit or receive circuitry 350 may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, the antenna 352 is an example of a "power transfer component" of a type that is configured to wirelessly output and/or receive power.

The antenna 352 may include an air core or a physical core such as a ferrite core (not shown). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2A) within a plane of the transmit antenna 214 (FIG. 2A) where the coupled-mode region of the transmit antenna 214 may be more powerful.

As stated, efficient transfer of energy between the transmitter 104/204 and the receiver 108/208 may occur during matched or nearly matched resonance between the transmitter 104/204 and the receiver 108/208. However, even when resonance between the transmitter 104/204 and receiver 108/208 are not matched, energy may be transferred, although the efficiency may be affected. For example, the efficiency may be less when resonance is not matched. Transfer of energy occurs by coupling energy from the wireless field 105/205 of the transmit coil 114/214 to the receive coil 118/218, residing in the vicinity of the wireless field 105/205, rather than propagating the energy from the transmit coil 114/214 into free space.

The resonant frequency of the loop or magnetic antennas is based on the inductance and capacitance of the transmit/receive circuitry 206/210. Inductance may be simply the inductance created by the antenna 352, whereas, capacitance may be added to the antenna's inductance to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. Accordingly, for larger diameter antennas, the size of capacitance needed to sustain resonance may decrease as the diameter or inductance of the loop increases.

Furthermore, as the diameter of the antenna increases, the efficient energy transfer area of the near-field may increase. Other resonant circuits formed using other components are also possible. As another non-limiting example, a capacitor may be placed in parallel between the two terminals of the circuitry 350. For transmit antennas, the signal 358, with a frequency that substantially corresponds to the resonant frequency of the antenna 352, may be an input to the antenna 352.

Referring to FIGS. 1 and 2A-B, the transmitter 104/204 may output a time varying magnetic (or electromagnetic) field with a frequency corresponding to the resonant frequency of the transmit coil 114/214. When the receiver 108/208 is within the wireless field 105/205, the time varying magnetic (or electromagnetic) field may induce a voltage in the receive coil 118/218. As described above, if the receive coil 118/218 is configured to resonate at the frequency of the transmit coil 114/214, energy may be efficiently transferred. The AC signal induced in the receive coil 118/218 may be rectified as described above to produce a DC signal that may be provided to charge or to power a load.

Figure 4C:
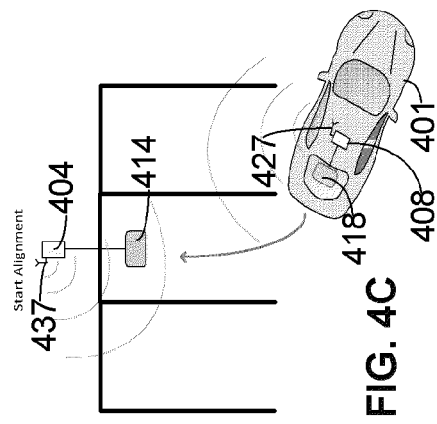
FIGS. 4A-4E are depictions of an alignment operation of electric vehicle and a wireless power transfer system, in accordance with an exemplary implementation.
Figure 4B:
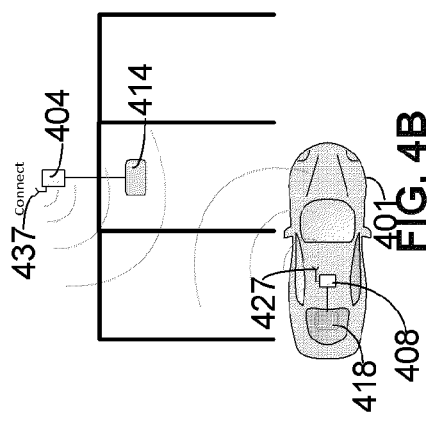
Figure 4E:
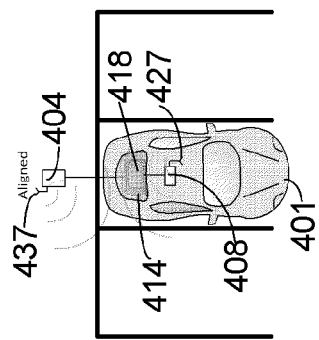
Figure 4A:
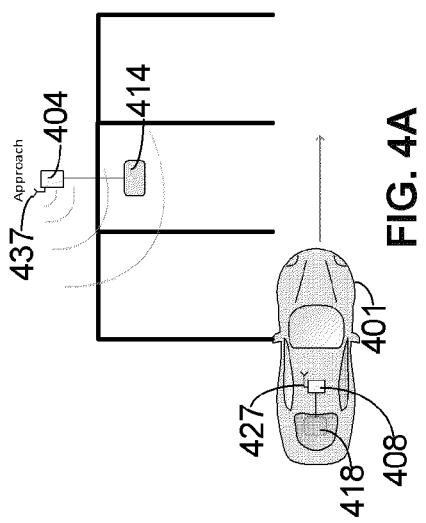
Figure 4D:
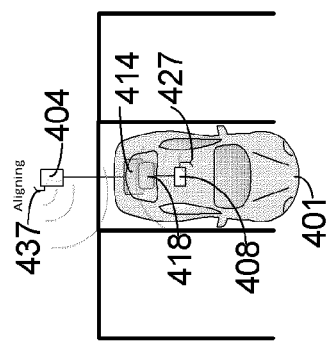

FIGS. 4A, 4B, 4C, 4D, and 4E are depictions of an alignment operation between an electric vehicle and a wireless power transfer system, in accordance with an exemplary implementation of the invention. FIG. 4A shows an electric vehicle 401 including a wireless power transfer and communication receiver 408 electrically connected to a receive antenna or coil 418 and a communications antenna 427. FIG. 4A also shows a wireless power transfer and communication transmitter 404 electrically connected to a transmit antenna or coil 414 and a communications antenna 437. The communications antenna 427 may be different from the receive coil 418. The communications antenna 437 may be different from the transmit coil 414. The communications antennas 427 and 437 may be configured to facilitate communication between the receiver 408 and the transmitter 404, respectively, as the vehicle 401 approaches. FIG. 4B shows the receiver 408 onboard the vehicle 401 establishing communication with the transmitter 404. In FIG. 4C, an alignment procedure may begin as the vehicle 401 moves towards the transmit coil 414. The communications link provides visual feedback, auditory feedback, or combinations thereof to a driver of the vehicle 401. The driver may use this feedback to determine when the vehicle 401 is properly positioned for wireless power transfer. In FIG. 4D, the alignment procedure continues as the vehicle 401 finalizes alignment by positioning the vehicle 401 such that the receive coil 418 mounted to the vehicle 410 is substantially aligned with the transmit coil 414. Finally, FIG. 4E shows the vehicle 401 positioned such that the receive coil 418 is substantially aligned with the transmit coil 414 of the transmitter 404.

Figure 5:
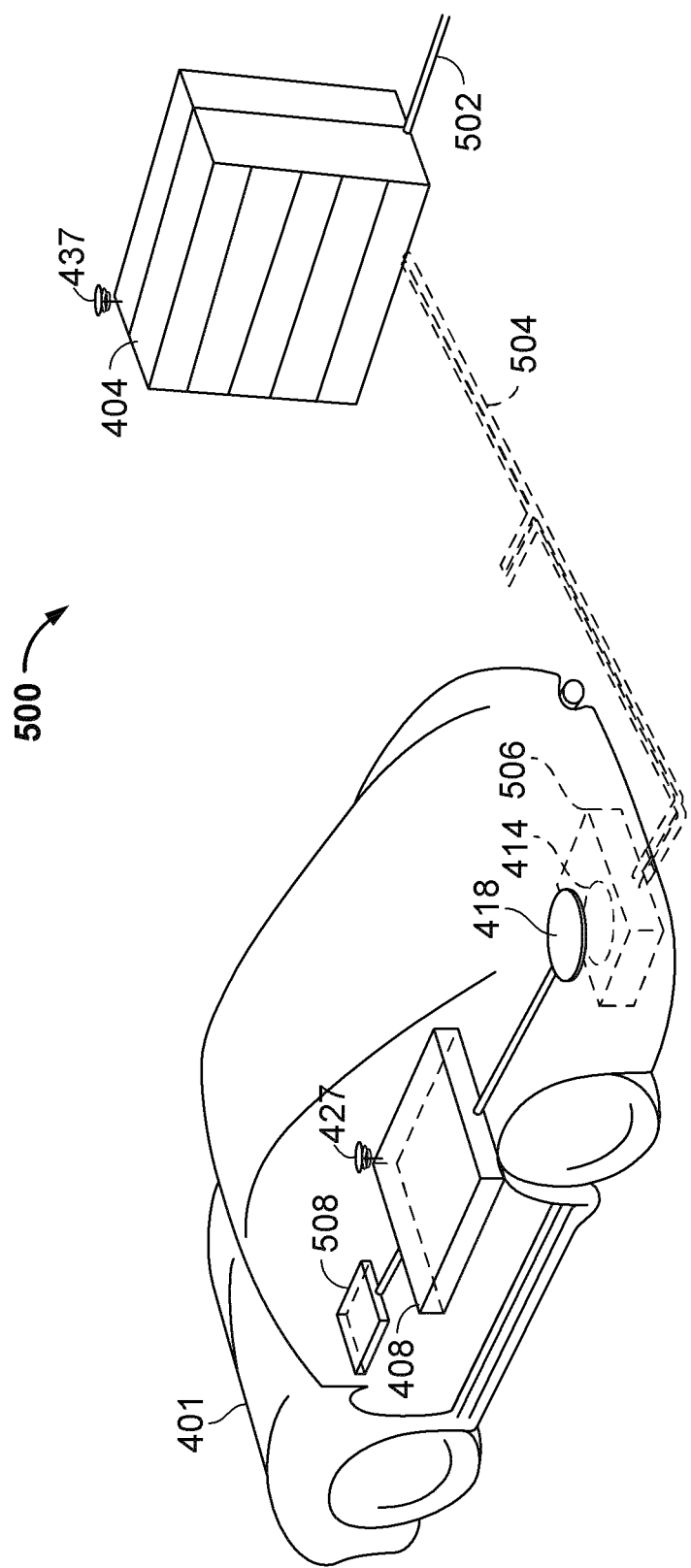
FIG. 5 is a diagram of a vehicle aligned over a transmitter antenna, in accordance with an exemplary implementation.

FIG. 5 is a diagram of a vehicle aligned over a transmitter antenna, in accordance with an exemplary implementation of the invention. The wireless power transfer system 500 allows charging of the vehicle 401 while the vehicle 401 is parked near the transmitter 404. Space is shown for the vehicle 401 to be parked over the transmit antenna/coil 414. The transmit coil 414 may be located within a base pad 506. In some implementations, the transmitter 404 may be connected to a power backbone 502. The transmitter 404 may be configured to provide an alternating current (AC), through an electrical connection 504, to the transmit coil 414 located within the base pad 506. As described in connection with FIG. 4 above, the vehicle 401 may include a battery 508, the receive coil 418, and the antenna 427 each connected to the receiver 408.

In some implementations, the receive coil 418 may receive power when the receive coil 418 is located in a wireless (e.g., magnetic or electromagnetic) field produced by the transmit coil 414. The wireless field corresponds to a region where energy output by the transmit coil 414 may be captured by the receive coil 418. In some cases, the wireless field may correspond to the "near field" of the transmit coil 414.

It is desirable that the receive coil 418 provides at least a minimum rated current or power to the receiver 404 in order to charge the battery 508 or power the vehicle 401. The minimum rated current or power may include operation/operating frequency requirements to assure interoperability between the wireless power transfer system 500 and the vehicle 401. A fault in the wireless power transfer system 500 or the vehicle 401 may cause a change or drift in the operation frequency which can adversely affect the performance of IPT system. The measurement circuitry 250 of FIG. 2B, or variations thereof, may be implemented into the system 500 and/or the vehicle 401 to monitor the IPT system operation frequency according to the features described herein.

Figure 6A:
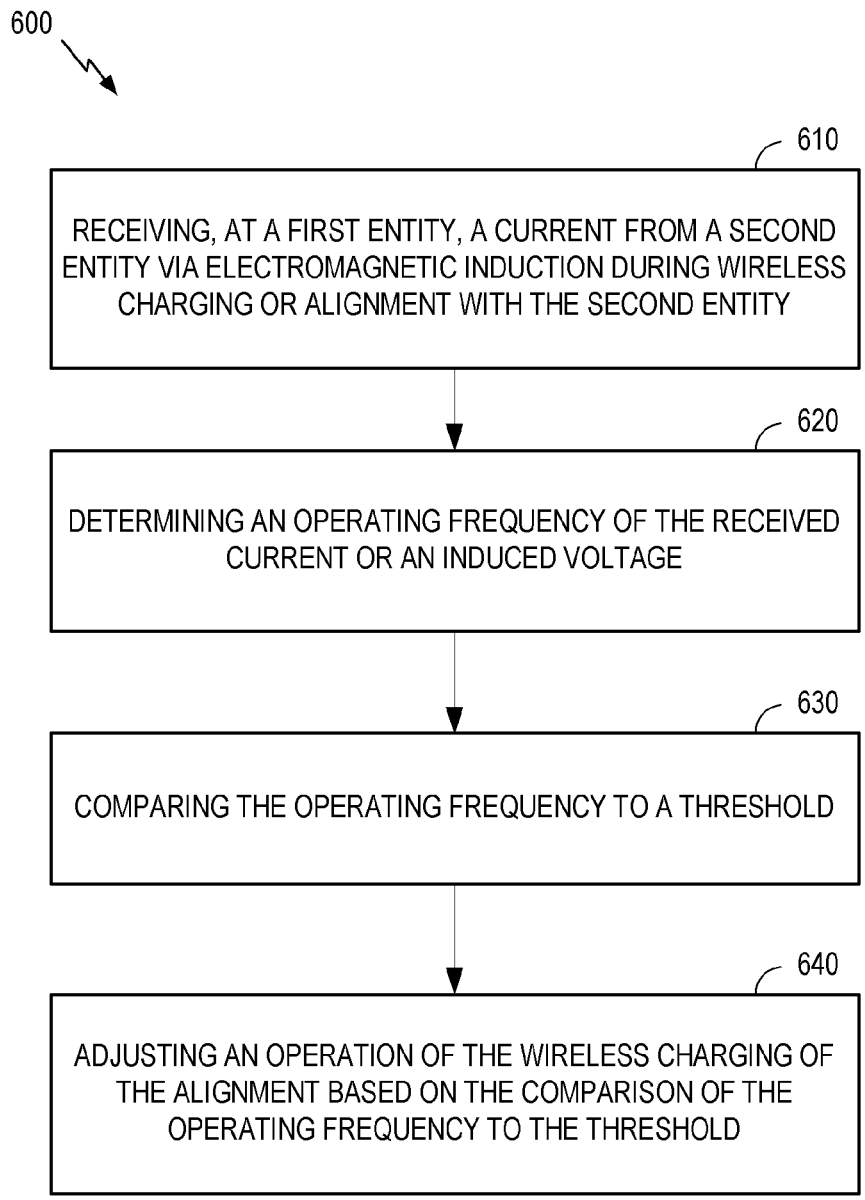
FIG. 6A is a flowchart of an exemplary method for controlling wireless charging.

FIG. 6A provides a flowchart of an exemplary method 600 for wireless charging, in accordance with one or more aspects of the present disclosure. Although the method 600 is described herein with reference to a particular order, in various implementations, the step(s) or feature(s) herein may be performed in a different order, or may be omitted, or may include additional step(s)/features(s). The method 600 may be operable by a first entity (e.g., an IPT receiver, such as an electric vehicle) for frequency protection during wireless charging or alignment with a second entity (e.g., an IPT transmitter).

The method 600 may involve, at 610, receiving a current wirelessly from the second entity via electromagnetic induction during the wireless charging or the alignment with the second entity. In one implementation, block 610 may be performed by the receive antenna 218 and the receive circuitry 210 of FIG. 2A. In another implementation, block 610 may be performed by the antenna/coil 352 of the transmit/receive circuitry 350 of FIG. 3.

The method 600 may involve, at 620, determining an operating frequency of the received current or an induced voltage (i.e., induced by the electromagnetic induction). Block 620 may involve, for example, generating a measurement waveform from the received current or induced voltage, the measurement waveform indicative of an operating frequency of the received current or the induced voltage. In one implementation, block 620 may be performed by the current transformer 252 and/or the edge detector 254 of FIG. 2B.

The method 600 may involve, at 630, comparing the operating frequency to a threshold. Block 630 may involve, for example, comparing the operating frequency to a nominal frequency to determine an error value between the operating and nominal frequencies. The method 600 may involve, at 640, adjusting an operation of the wireless charging of the alignment based on the comparison at block 630. Block 640 may involve, for example, continuing the charging or the alignment in response to a difference between the operating frequency and the threshold being less than or equal to a first tolerance level, and/or stopping or refusing the charging or the alignment in response to the difference being greater than the first tolerance level. In one implementation, blocks 630 and 640 may be performed by the reference clock 256 and/or the microcontroller 264 of FIG. 2B.

Figure 6B:
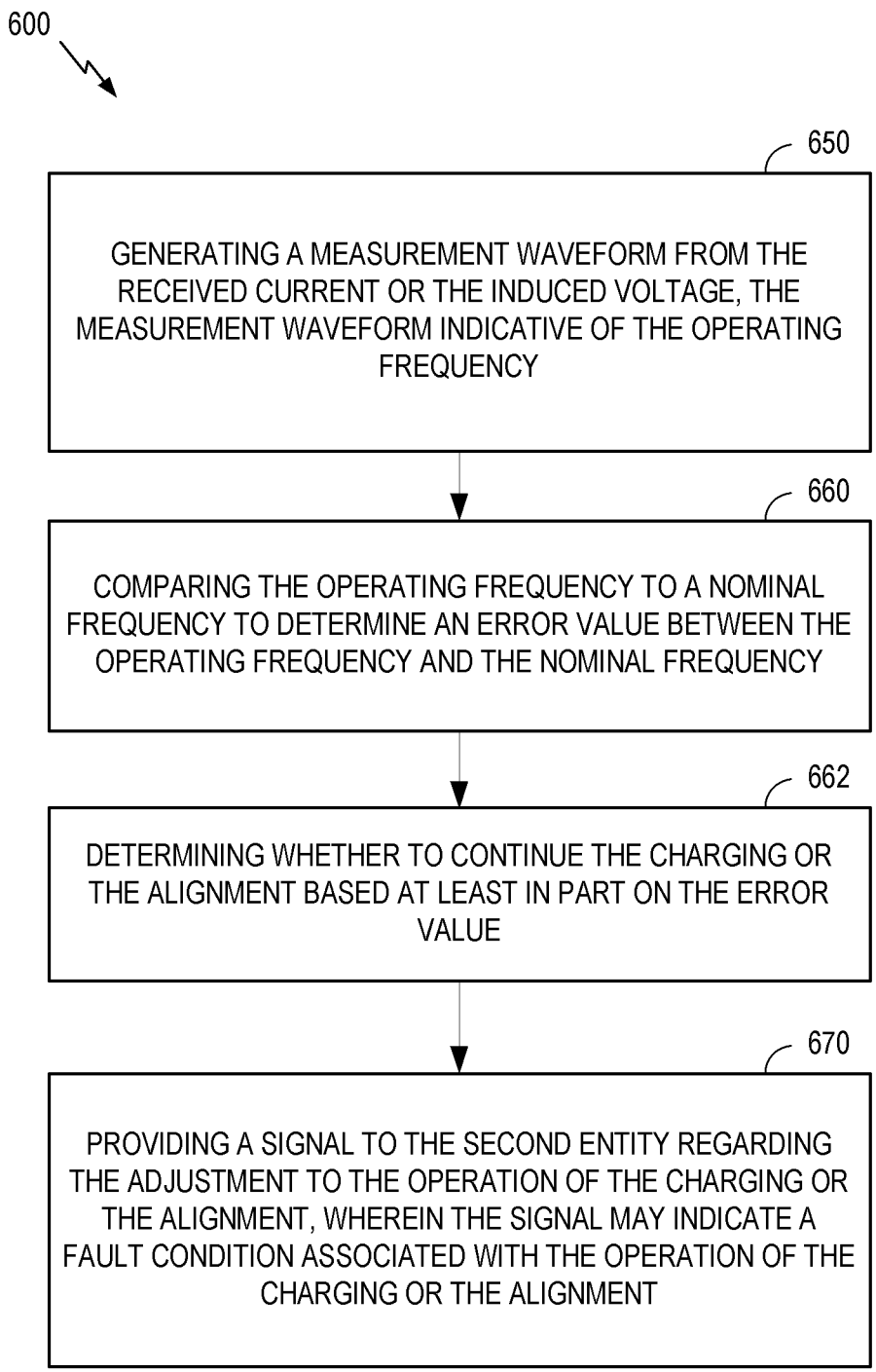
FIGS. 6B-C show further aspects of the example method of FIG. 6A.
Figure 6C:
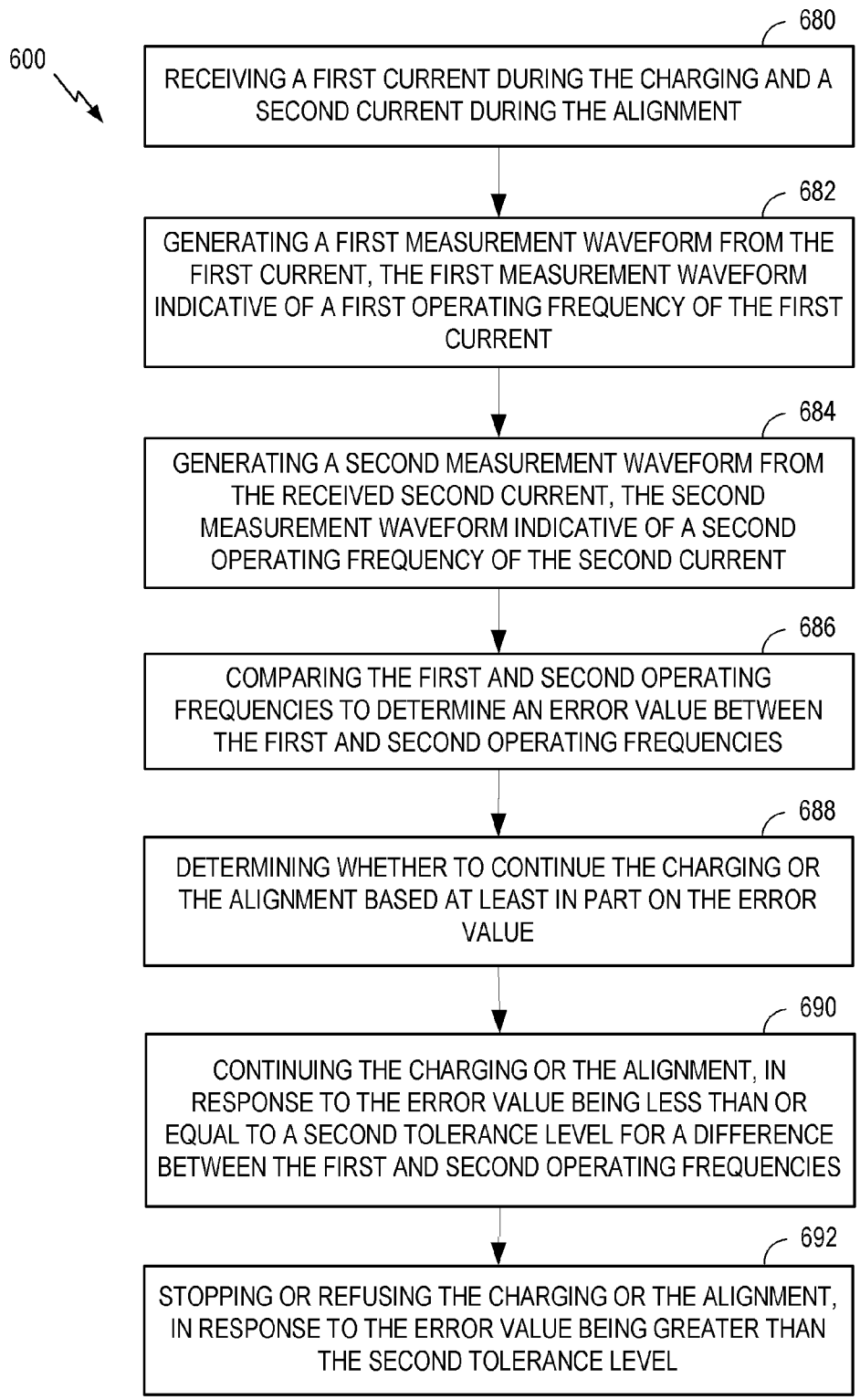

FIGS. 6B-C show further operations or aspects of method 600 that are optional are not required to perform the method 600. If the method 600 includes at least one block of FIGS. 6B-C, then the method 600 may terminate after the at least one block, without necessarily having to include any subsequent downstream block(s) that may be illustrated. With reference to FIG. 6B, block 620 may involve, at 650, determining the operating frequency involves generating a measurement waveform from the received current or the induced voltage, the measurement waveform indicative of the operating frequency. For example, block 650 may be performed by the current transformer 252 and/or the edge detector 254 of FIG. 2B or the like.

In further related aspects, block 630 may involve, at 660, comparing the operating frequency to a nominal frequency to determine an error value between the operating frequency and the nominal frequency. Block 640 may involve, at 662, determining whether to continue the charging or the alignment based at least in part on the error value. For example, blocks 660 and 662 may be performed by the reference clock 256 and/or the microcontroller 264 of FIG. 2B or the like.

In yet further related aspects, method 600 may further involve, at 670, providing a signal to the second entity regarding the adjustment to the operation of the charging or the alignment, wherein the signal may indicate a fault condition associated with the operation of the charging or the alignment. For example, block 670 may be performed by the antenna/coil 352 of the transmit/receive circuitry 350 of FIG. 3 coupled to the measurement circuit 250 of FIG. 2B, or the like.

With reference to FIG. 6C, block 610 may involve, at 680, receiving a first current during the charging and a second current during the alignment. Block 620 may involve, at 682, generating a first measurement waveform from the first current, the first measurement waveform indicative of a first operating frequency of the first current, as well as, at 684, generating a second measurement waveform from the received second current, the second measurement waveform indicative of a second operating frequency of the second current. The method 600 may further involve, at 686, comparing the first and second operating frequencies to determine an error value between the first and second operating frequencies, as well as, at 688, determining whether to continue the charging or the alignment based at least in part on the error value. Block 688 may involve, at 690, continuing the charging or the alignment in response to the error value being less than or equal to a second tolerance level for a difference between the first and second operating frequencies, as well as, at 692, stopping or refusing the charging or the alignment in response to the error value being greater than the second tolerance level. For example, block 680 may be performed by the current transformer 252 and/or the edge detector 254 of FIG. 2B or the like, while blocks 682 and 684 may be performed by the current transformer 252 and/or the edge detector 254 of FIG. 2B or the like, while blocks 686, 688, 690, and 692 may be performed by the reference clock 256 and/or the microcontroller 264 of FIG. 2B or the like.

Figure 7:
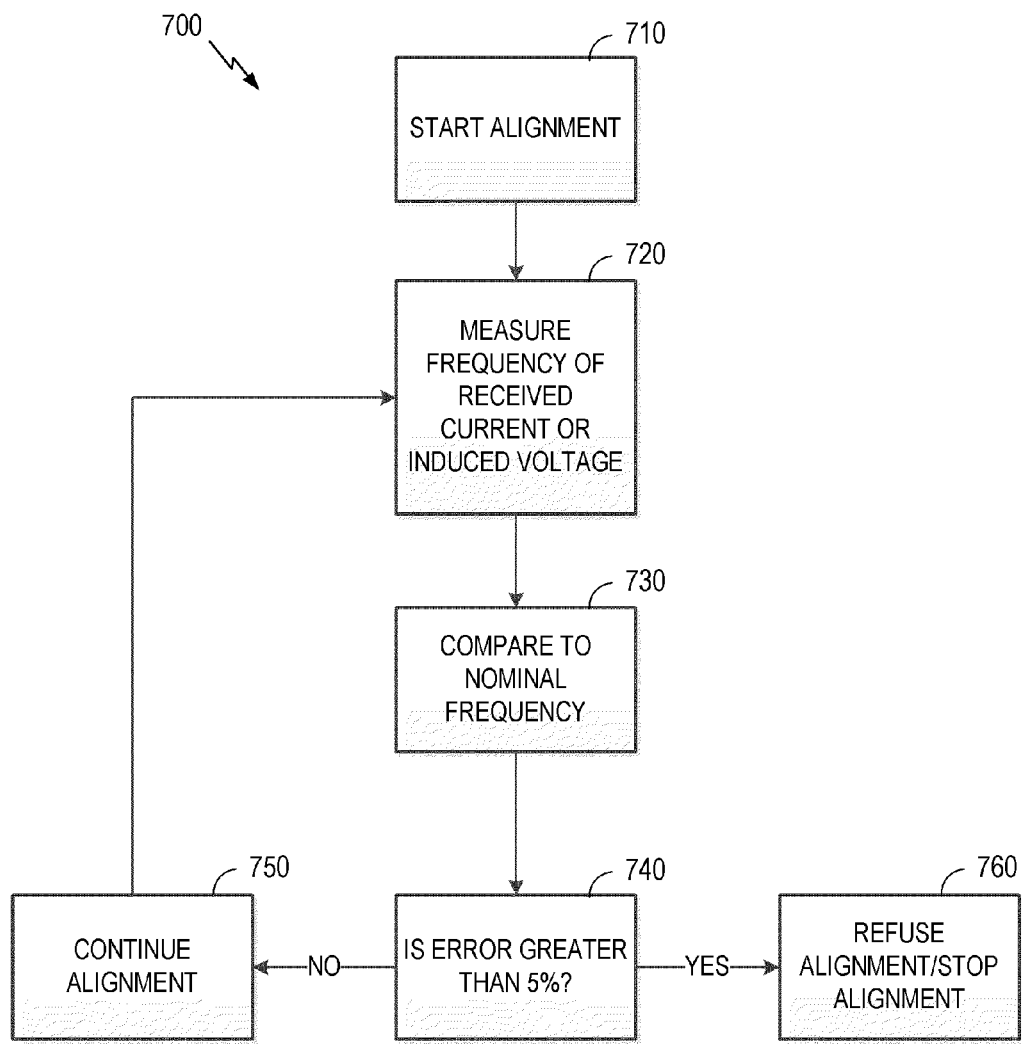
FIG. 7 is a flowchart of an exemplary method for frequency protection during an alignment operation.

FIG. 7 is a flowchart depicting an exemplary implementation of a method 700 for frequency protection during an alignment operation, in accordance with one or more aspects of the present disclosure. The method 700 may involve, at 710, starting an alignment process with a charging unit and a receiving unit. For example, block 710 may be performed by the receiver 408 onboard the vehicle 401 of FIGS. 4A-E and FIG. 5 to start an alignment with a charging unit (e.g., the transmitter 404). In another example, block 710 may be performed by the transmitter 404 of a charging station or the like coupled to the base pad 506 and the powerback bone 502 (see FIGS. 4A-E and FIG. 5), wherein the transmitter 404 may be configured to start an alignment with the receiving unit (e.g., the receiver 408).

The method 700 may involve, at 720, measuring a frequency of a current received via IPT. For example, block 720 may be performed by the current transformer 252 and/or the edge detector 254 of FIG. 2B or the like.

The method 700 may involve, at 730, comparing the measured frequency of the received current or induced voltage to a known/nominal frequency. The method 700 may involve, at 740, determining whether the difference/error between the measured frequency and the nominal frequency is greater than a tolerance level/range, such as, for example, about 5% or other percentage defined by the user/administrator and/or the particular application of the method 700. For example, blocks 730 and 740 may be performed by the reference clock 256 and/or the microcontroller 264 of FIG. 2B or the like.

The method 700 may involve, at 750, continuing the alignment if the difference/error between the measured frequency and the nominal frequency is not greater than the tolerance level/range. The method 700 may involve, at 760, refusing the alignment or stopping the alignment if the difference/error between the measured frequency and the nominal frequency is greater than the tolerance level/range. In related aspects, the method 700 may optionally involve comparing the measured frequency with a corresponding frequency measured during the charging process, and determining whether to continue or stop the alignment process based at least in part on a difference/error between the frequencies measured during the alignment and charging processes. In one example, blocks 750 and/or 760 may be performed by the receiver 408 of FIGS. 4A-E and FIG. 5 having one or more processors/controllers (e.g., the microcontroller 264 of FIG. 2B). In another example, blocks 750 and/or 760 may be performed by the transmitter 404 of FIGS. 4A-E and FIG. 5 that is in operative communication with the receiver 408.

Figure 8:
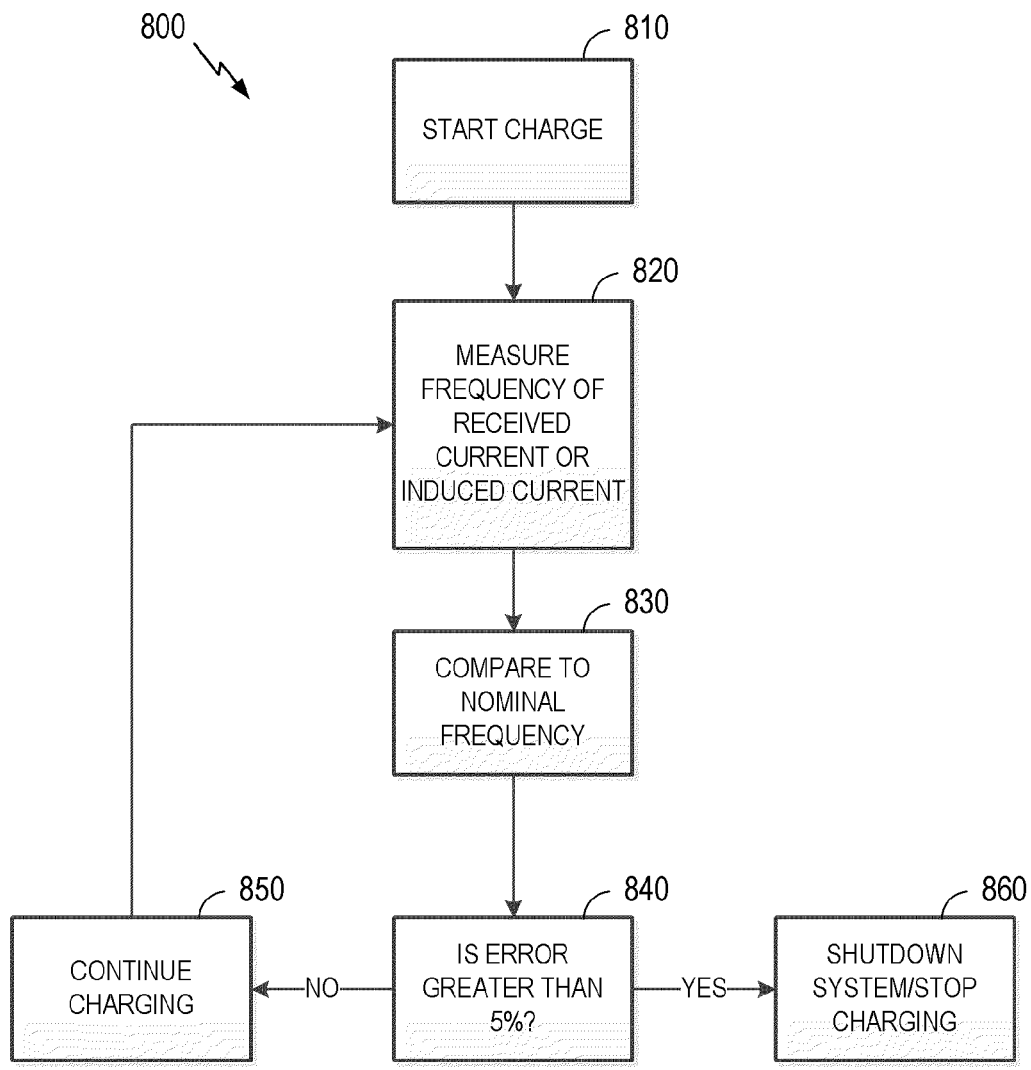
FIG. 8 is a flowchart of an exemplary method for frequency protection during a charging operation.

FIG. 8 is a flowchart depicting another exemplary implementation of a method 800 for frequency protection during a wireless charging operation, in accordance with one or more aspects of the present disclosure. The method 800 may involve, at 810, starting a charging process with a charging unit and a receiving unit. For example, block 810 may be performed by the receiver 408 onboard the vehicle 401 of FIGS. 4A-E and FIG. 5 to start an alignment with a charging unit (e.g., the transmitter 404). In another example, block 810 may be performed by the transmitter 404 of a charging station or the like coupled to the base pad 506 and the powerback bone 502 (see FIGS. 4A-E and FIG. 5), wherein the transmitter 404 may be configured to start an alignment with the receiving unit (e.g., the receiver 408).

The method 800 may involve, at 820, measuring a frequency of a current received via IPT. For example, block 820 may be performed by the current transformer 252 and/or the edge detector 254 of FIG. 2B or the like.

The method 800 may involve, at 830, comparing the measured frequency of the received current or induced voltage to a known/nominal frequency. The method 800 may involve, at 840, determining whether the difference/error between the measured frequency and the nominal frequency is greater than a tolerance level/range, such as, for example, about 5% or the like. For example, blocks 830 and 840 may be performed by the reference clock 256 and/or the microcontroller 264 of FIG. 2B or the like.

The method 800 may involve, at 850, continuing the charging if the difference/error between the measured frequency and the nominal frequency is not greater than the tolerance level/range. The method 800 may involve, at 860, shutting down the IPT system or stopping the charging if the difference/error between the measured frequency and the nominal frequency is greater than the tolerance level/range. In related aspects, the method 800 may optionally involve comparing the measured frequency with a corresponding frequency measured during the alignment process, and determining whether to continue or stop the charging process based at least in part on a difference/error between the frequencies measured during the charging and alignment processes. In one example, blocks 850 and/or 860 may be performed by the receiver 408 of FIGS. 4A-E and FIG. 5 having one or more processors/controllers (e.g., the microcontroller 264 of FIG. 2B). In another example, blocks 850 and/or 860 may be performed by the transmitter 404 of FIGS. 4A-E and FIG. 5 that is in operative communication with the receiver 408.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

In one aspect, means for receiving a current wirelessly at a first entity from a second entity via electromagnetic induction during the charging or alignment with the second entity, and/or means for receiving a first current during the charging and means for receiving a second current during the alignment, may comprise, for example, the antenna/coil 352 of the transmit/receive circuitry 350 of FIG. 3 coupled to the measurement circuit 250 of FIG. 2B.

In another aspect, means for determining an operating frequency of the received current or a voltage induced by the electromagnetic induction, means for generating a measurement waveform from the received current or the induced voltage, means for generating a first measurement waveform from the first current, and/or means for generating a second measurement waveform from the second current, may comprise, for example, the current transformer 252 and/or the edge detector 254 of FIG. 2B.

In yet another aspect, means for comparing the frequency to a threshold and/or means for comparing the operating frequency to a nominal frequency to determine an error value between the operating frequency and the nominal frequency, may comprise, for example, the reference clock 256 and/or the microcontroller 264 of FIG. 2B.

In still another aspect, means for comparing the first and second operating frequencies to determine an error value between the first and second operating frequencies and/or means for determining whether to continue the charging or the alignment based at least in part on the error value may comprise, for example, the reference clock 256 and/or the microcontroller 264 of FIG. 2B.

In another aspect, means for adjusting an operation of the charging or the alignment based on the comparison or the error value, means for continuing the charging or the alignment in response to a difference between the operating frequency and the threshold being less than or equal to a first tolerance level, means for stopping or refusing the charging or the alignment in response to the difference being greater than the first tolerance level, means for continuing the charging or the alignment in response to the error value being less than or equal to a second tolerance level for a difference between the first and second operating frequencies, and/or means for stopping or refusing the charging or the alignment in response to the error value being greater than the second tolerance level, may comprise, for example, the receiver 408 of FIGS. 4A-E and FIG. 5. In another example, the means for adjusting the operation of the charging or the alignment, and/or aspects thereof as listed above, may comprise the transmitter 404 of FIGS. 4A-E and FIG. 5 that is in operative communication with the receiver 408.

In yet another aspect, means for providing a signal to the second entity regarding the adjustment to the operation of the charging or the alignment may comprise, for example, the antenna/coil 352 of the transmit/receive circuitry 350 of FIG. 3.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the invention.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular implementation of the invention. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An apparatus for controlling wireless charging, comprising:

a receiver communication circuit of a first entity configured to receive a current wirelessly from a second entity via electromagnetic induction during the charging of the first entity;

a frequency measurement circuit configured to determine an operating frequency of the received current induced by the electromagnetic induction; and a controller configured to:
  receive a pulse waveform indicating a target frequency,
  determine a first frequency difference between the operating frequency and the target frequency,
  continue the charging in response to determining that the first frequency difference is less than or equal to a first tolerance level, and
  stop the charging in response to determining that the first frequency difference is greater than the first tolerance level.

2. The apparatus of claim 1, wherein the frequency measurement circuit is further configured to determine the operating frequency based on generating a measurement waveform from the received current, the measurement waveform being indicative of the operating frequency.

3. The apparatus of claim 1, wherein the first tolerance level comprises a 5% difference between the operating and target frequencies.

4. The apparatus of claim 1, wherein the controller is further configured to provide a signal to the second entity regarding the continuing or the stopping of the charging.

5. The apparatus of claim 4, wherein the signal indicates a fault condition associated with the operation of the charging.

6. The apparatus of claim 1, wherein the receiver communication circuit is further configured to receive a first current during the charging and a second current during alignment of the first entity with the second entity.

7. The apparatus of claim 6, wherein the frequency measurement circuit is further configured to:
  generate a first measurement waveform from the first current, the first measurement waveform being indicative of a first operating frequency of the first current; and
  generate a second measurement waveform from the second current, the second measurement waveform being indicative of a second operating frequency of the second current.

8. The apparatus of claim 7, wherein controller is further configured to:
  compare the first and second operating frequencies to determine a second frequency difference between the first and second operating frequencies; and
  determine whether to continue the charging based at least in part on the second frequency difference.

9. The apparatus of claim 8, wherein controller is further configured to:
  continue the charging in response to determining that the second frequency difference is less than or equal to a second tolerance level for a difference between the first and second operating frequencies; and
  stop the charging in response to determining that the second frequency difference is greater than the second tolerance level.

10. The apparatus of claim 1, wherein the first entity comprises an inductive power transfer (IPT) receiver and the second entity comprises an IPT transmitter.

11. The apparatus of claim 1, wherein the first entity comprises an inductive power transfer (IPT) transmitter and the second entity comprises an IPT receiver.

12. A method operable by a first entity for controlling wireless charging, comprising:
  receiving a current wirelessly from a second entity via electromagnetic induction during the charging of the first entity;
  determining an operating frequency of the received current induced by the electromagnetic induction;
  receiving a pulse waveform indicating a target frequency,
  determining a first frequency difference between the operating frequency and the target frequency;
  continuing the charging in response to determining that the first frequency difference is less than or equal to a first tolerance level; and
  stopping the charging in response to determining that the first frequency difference is greater than the first tolerance level.

13. The method of claim 12, wherein determining the operating frequency comprises generating a measurement waveform from the received current, the measurement waveform being indicative of the operating frequency.

14. The method of claim 12, further comprising providing a signal to the second entity regarding the continuing or stopping of the charging.

15. The method of claim 14, wherein the signal indicates a fault condition associated with the operation of the charging.

16. The method of claim 12, wherein receiving the current comprises receiving a first current during the charging and a second current during alignment of the first entity with the second entity.

17. The method of claim 16, wherein determining the operating frequency comprises:
  generating a first measurement waveform from the first current, the first measurement waveform being indicative of a first operating frequency of the first current; and
  generating a second measurement waveform from the received second current, the second measurement waveform being indicative of a second operating frequency of the second current.

18. The method of claim 17, further comprising:
  comparing the first and second operating frequencies to determine a second frequency difference between the first and second operating frequencies; and
  determining whether to continue the charging based at least in part on the second frequency difference.

19. The method of claim 18, further comprising:
  continuing the charging in response to determining that the second frequency difference is less than or equal to a second tolerance level for a difference between the first and second operating frequencies; and
  stopping the charging in response to determining that the second frequency difference is greater than the second tolerance level.

20. An apparatus for controlling wireless charging between a first entity and a second entity, comprising:
  means for receiving a current wirelessly from the second entity via electromagnetic induction during the charging of the first entity;
  means for determining an operating frequency of the received current induced by the electromagnetic induction;
  means for receiving a pulse waveform indicating a target frequency,
  means for determining a first frequency difference between the operating frequency and the target frequency;

means for continuing the charging in response to determining that the first frequency difference is less than or equal to a first tolerance level; and means for stopping the charging in response to determining that the frequency difference is greater than the first tolerance level.

21. The apparatus of claim 20, wherein the means for determining the operating frequency comprises means for generating a measurement waveform from the received current, the measurement waveform being indicative of the operating frequency.

22. The apparatus of claim 20, further comprising means for providing a signal to the second entity regarding the continuing or stopping of the charging.

23. The apparatus of claim 22, wherein the signal indicates a fault condition associated with the operation of the charging.

24. The apparatus of claim 20, wherein the means for receiving the current comprises means for receiving a first current during the charging and means for receiving a second current during alignment of the first entity with the second entity.

25. The apparatus of claim 24, wherein means for determining the operation frequency comprises:

means for generating a first measurement waveform from the first current, the first measurement waveform being indicative of a first operating frequency of the first current; and means for generating a second measurement waveform from the second current, the second measurement waveform being indicative of a second operating frequency of the second current.

26. The apparatus of claim 25, further comprising:

means for comparing the first and second operating frequencies to determine a second frequency difference between the first and second operating frequencies; and means for determining whether to continue the charging based at least in part on the second frequency difference.

27. The apparatus of claim 26, wherein the means for determining whether to continue the charging or the alignment based at least in part on the frequency difference comprises:

means for continuing the charging in response to determining that the second frequency difference is less than or equal to a second tolerance level for a difference between the first and second operating frequencies; and means for stopping the charging in response to determining that the second frequency difference is greater than the second tolerance level.

\* \* \* \* \*

UNITED STATES PATENT AND TRADEMARK OFFICE
CERTIFICATE OF CORRECTION

PATENT NO. : 9,680,331 B2  
APPLICATION NO. : 14/555380  
DATED : June 13, 2017  
INVENTOR(S) : Nicholas Athol Keeling It is certified that error appears in the above-identified patent and that said Letters Patent is hereby corrected as shown below:

In the Claims

In Column 17 at Line 5 (approx.), In Claim 20, after "the" insert --first--. (First Occurrence)

Signed and Sealed this  
Sixteenth Day of January, 2018

Joseph Matal  
*Performing the Functions and Duties of the*  
*Under Secretary of Commerce for Intellectual Property and*  
*Director of the United States Patent and Trademark Office*